United States Patent [19]

Haruki

[11] Patent Number: 5,112,087
[45] Date of Patent: May 12, 1992

[54] PIPE JOINT

[75] Inventor: Shimade Haruki, Nara, Japan

[73] Assignee: Nitta-Moore Co., Ltd., Osaka, Japan

[21] Appl. No.: 596,322

[22] Filed: Oct. 12, 1990

[30] Foreign Application Priority Data

Oct. 25, 1989 [JP] Japan .................................. 1-277950
Mar. 23, 1990 [JP] Japan .................................. 2-74292

[51] Int. Cl.⁵ ............................................. F16L 17/04
[52] U.S. Cl. .................................... 285/101; 285/255;
285/322; 285/316; 285/321
[58] Field of Search ............... 285/249, 255, 322, 323,
285/307, 316, 906, 321, 101, 104, 105

[56] References Cited

U.S. PATENT DOCUMENTS 3,352,576 11/1967 Thomsen .................. 285/316 X
4,303,263 12/1981 Legris ........................ 285/249
4,775,171 10/1988 Marshall .................. 285/255 X

FOREIGN PATENT DOCUMENTS 2398958 3/1979 France .......................... 285/249

Primary Examiner—Dave W. Arola
Attorney, Agent, or Firm—Koda and Androlia

[57] ABSTRACT

The present invention relates to a pipe joint for connecting a piping comprising a cylindrical body with both ends open and a connecting part to a socket, the socket having a tapered part on the internal circumference and diminishing in diameter toward the open side, one end of the socket attached to the connecting part of the body and the other end of the socket being as the pipe inserting port and, an insert provided to the body in a way to slide freely within a certain range and having a free end facing the pipe inserting port, and a collet placed between the internal circumferential face of the socket and the insert in a way to advance and retreat freely.

9 Claims, 8 Drawing Sheets

PIPE JOINT

BACKGROUND OF THE INVENTION

1. Field of the Invention

The invention of the present application relates to a pipe joint for connecting piping.

2. Prior Art

Hetherto, there exists a pipe joint of this type which is provided, as shown in FIG. 10 for example, with a sleeve 5 having an inclined face 50 in a large-diameter hole 11 of a nipple 1, the face inclining in such a way that the diameter of its internal circumferential face diminishes toward an opening in the axial direction, an insert 3 slidably mounted and having a through hole 30 leading to a small-diameter hole 10 of the nipple 1, and a collet 4 having an external circumferential face 40 which can get in contact with the inclined face 50 of the sleeve 5 and designed to be expandable and contractible in diameter when sliding in the axial direction inside the sleeve 5.

However, with the conventional pipe joint mentioned above, it is impossible to fit the three members, or the above-mentioned sleeve 5, insert 3 and collet 4, in the large-diameter hole 11 of the nipple unless it is relatively a deep hole and, therefore, it is necessary to reduce the thickness around the large-diameter hole to a great extent in machining of the nipple 1.

As a result, the machining of the large-diameter hole 11 of this nipple 1 presents such problems as very much of machining even with cutting process and plastic working like forging and difficulty of high-accurate machining thereby.

Moreover, the conventional pipe joint also has a problem of high cost because machining of the sleeve 5 requires cutting with a lathe, etc. to provide an inclined face 50 on the internal circumferential face of the sleeve 5, the face inclining in such a way that the diameter diminishes toward the open side in the axtial direction.

Another problem with the conventional pipe joint is impossibility of reuse of the pipe joint because once a hose H is connected with the pipe joint, they could not be separated from each other.

In addition, the conventional pipe joint also has other problems as described hereunder.

As shown in the drawing FIG. 10, the pipe joint is constructed by installing an insert 3 coaxially and slidably with the nipple in a cylindrical nipple 1 having an external thread on one end, and by placing a collet 4 between the insert 3 and the nipple 1 in a way to allow the collet to advance or retreat freely therein, and is designed to fix a pipe inserted between the insert 3 and the collet 4 in a non-detachable state with the holding force of those memembers.

For that purpose, the nipple 1 is provided with a pipe inserting port 11a at one end as shown in the drawing, and a tapered part 50 diminishing in diameter toward its opening side is formed on the internal circumference near the pipe inserting port 11a.

The collet 4, which is constructed with an elastic material, has an outside diameter slightly larger than the diameter of the pipe inserting port 11a as indicated in the drawing and a slit 42 opening to the pipe inserting port 11a formed on the circumferential wall thereof.

And, the gap between the collet 4 and the insert 3 is set slightly smaller than the thickness of the pipe to be connected to them.

Consequently, inserting a pipe forcibly between the collet 4 and the insert through the pipe inserting port 11a and then pulling the pipe cause the collet 4 and the insert 3 to move toward the pipe inserting port 11a together with the pipe. And, from the time when the collet 4 gets in contact with the tapered part 50, a pressing force from the tapered part 5 acts on the collet 4 in a direction to reduce its diameter and, as a result, the holding power of the pipe by the collet 4 and the insert 3 increases and the pipe is fixed in a non-detachable state.

Namely, this pipe joint is very convenient in that a pipe can be very easily connected by just being inserted in the pipe inserting port 11a and then pulled backward.

However, with the pipe joint of the above-mentioned type, there is a risk that, in case the collet 4 gets worn after a long period of use, the collet 4 may be broken when a connected pipe is pushed therein. In such a case, a stable connecting power cannot be obtained even if the pipe is pulled backward.

SUMMARY OF THE INVENTION

The present invention has been realized in view of the aforementioned circumstances and it is an object of the invention to provide a pipe joint with simple processing and low production cost.

Another object of the invention is to provide a pipe joint from which the hose H can be separated even after being connected thereto, thereby enabling to reuse the pipe joint.

A further object of the invention is to provide a pipe joint which not only solves the aforementioned problems but also makes it possible to connect a pipe in a stable state by preventing the pipe from moving in spite of a pressing force on the pipe.

To achieve those objects as well as other objects which may become apparent from the description given hereunder and the claims, the invention has the following characteristics:

Namely, the pipe joint of the invention of the present application is composed of a cylindrical body with both ends open and a connecting section at one end, a socket having a tapered part on its internal circumference near the pipe inserting port, the part diminishing in diameter toward the pipe inserting port, one end of the socket being fitted at the connecting section of the body and the other end of the socket being as the pipe inseting port, an insert mounted to the body with being slidable within a certain range and having a free end facing near the pipe inserting port, and a collet placed between the internal circumferential face of the socket and the insert in a way to advance and retreat freely.

The pipe joint of the invention is composed of a nipple 1 having a small-diameter hole 10 and a large-diameter hole 11 on its internal circumferenctial face as well as a circumferential groove 12 on its external circumferential face, a socket 2 attached to the circumferential groove 12 of the nipple 1 and having a tapered face 21 inclined in such a way that the diameter of the internal circumferential face diminishes toward an opening which is not attached to the groove, an insert 3 having a through hole 30 which leads to the small-diameter hole 10 of the nipple 1 and a sealing member 31 on one ending part thereof, the member being provided slidably to the large-diameter hole 11 of the nipple 12, and a collet 4 having an external circumferential face 40 capable of getting in contact with the tapered face 21 of the socket 2 and designed to be expandable and contractible in diameter while sliding within the socekt 2 in the axial direction.

Moreover, the pipe joint of the invention includes the nipple 1 with structure preventing the insert 15 from coming off.

Furthermore, the pipe joint of the invetion is provided with the nipple 1 and the socket 2 detachably.

According to the invention of the present application, in a pipe joint comprising;

a cylindrical main body 101 with both ends having a small-diameter part 118 and a large-diameter part 119 on its internal circumferentioal face, the open side of the large-diameter part 119 being as a pipe inserting port 110, a slender advancing/retreating cylinder 102 with a free end attached to the small-diameter part 118 of the main body 101 in a way freely slidable within a certain range, the free end facing near the pipe inserting port 110, and a holding cylinder 103 placed in a way to freely advance or retreat between the internal circumferential face of the large-diameter part 119 of the main body 101 and the slender advancing/retreating cylinder 103, the internal circumferential part near the pipe inserting port 110 of the main body being provided with a tapered part 111 which diminishes in diameter toward the open side, or the pipe inserting port, the outside diameter of the holding cylinder 103 being set slighly larger than that of the pipe inserting port 110 and the holding cylinder 103 having a slit 130 opening the pipe inserting port 110, the gap between the slender advanceing/retreating cylinder 102 and the holding cylinder 103 being set slightly smaller than the thickness of the pipe to be inserted therein, wherein the main body 101 includes a body and a separate socket 101b to be connected to it, the body having a small-diameter part 118 while the socket 110b having a large-diameter part 119 and a tapered part 11, and the external circumferential face of the slender advancing/retreating cylinder 102 is provided with a groove 106 housing a C type snap ring 107 of which the outside diameter gets larger than the diameter of smalldiameter part 118 in its expanded state, so that the groove 106 may be located at the stepped part of the small-diameter part 118 and the large-diameter part 119 when the slender advancing/retreating cylinder 102 moves near to the pipe inserting port 110 within its sliding range.

With the abovementioned means, the pipe joint of the invention of the present application has the following effects:

In the invention described it has become unnecessary to reduce much of the thickness of the body since the socket is attached to the body. In addition, the socket can be manufactured with drawing of a pipe material.

In the invention, it has become unnecessary to reduce much of the thikness of the large-diameter hole part 11 of the nipple 1 since the socket 2 attached to the largediameter hole 11 side of the nipple 1 is provided with the collet 4.

The tapered face 21 of the socket 2 on which the collet 4 is to be provided may be prepared with drawing of a pipe material.

The invention may prevent the insert 3 from coming off from the nipple 1 due to insufficient insertion of a hose into the pipe joint.

The invention enables separation between the hose and the pipe joint.

The inventions have the following effects:

When connecting piping by using the pipe joint, the connection may be performed easily according to the procedure in the part of prior art in this specification.

With this type, while connecting operation, or pulling operation of the pipe, when the C type snap ring 107 housed in the groove 106 of the slender advancing/retreating cylinder moves to the large-diameter part 119, the diameter of the C type snap ring 107 gets larger than that of the small-diameter part 118.

Since the groove 106 is designed to be located at the stepped part of the small-diameter part 118 and the large-diameter part 119 when the slender advancing/retreating cylinder 102 moves close to the pipe inserting port 110 in its sliding range, the C type snap ring 107 gets in the expanded state to such an extent that it may not come off from the groove 106 in the connecting condition of the pipe.

Therefore, even when a pressing force acts on the connected pipe, movement of the slender advancing/retreating cylinder 102 is prevented because the slender advancing/retreating cylinder 102 is engaged with the main body 101 through the C type snap ring 107.

Other characteristics and advantages of the invention will become apparaent with the explanation referring to the accompanying drawings.

BRIEF DESCRIPTION OF THE DRAWINGS

FIG. 1a is a partial longitudinal sectional view showing the state where no hose is connected with the pipe joint. FIG. 1b is a partial longitudinal sectional view showing the state where a hose is connected therewith. FIG. 1c is a partial longitudinal sectional view showing the state where an internal pressure is applied to the hose connected therewith.

FIG. 3a is a partial longitudinal sectional view showing the state where no hose is connected. FIG. 3b is a partial longitudinal sectional view showing the state where an internal pressure is applied to the hose connected.

FIG. 4a is a partial longitudinal sectional view showing the state of a hose being connected with the pipe joint. FIG. 4b is a partial longitudinal sectional view showing the operation of detaching the pipe joint from the hose. FIG. 4c is a partial longitudinal sectional view showing the state of the pipe joint and the hose being separated.

DETAILED DESCRIPTION OF THE INVENTION

Figure 1A:
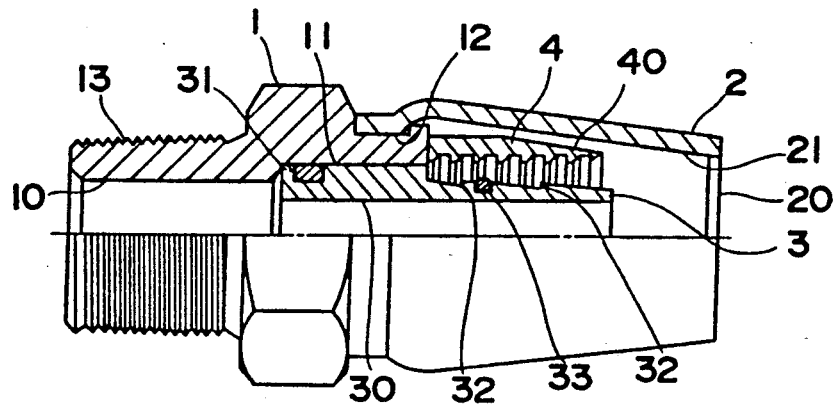
FIGS. 1a, 1b, and 1c indicate an embodiment of the pipe joint of the present invention.

Now referring to the drawings, the construction of the pipe joint corresponding to the present inventions is described below.

As indicated in the drawings, a pipe joint of the present invetnion comprises a nipple 1 forming a main body, a socket 2, an insert 3 and a collet 4.

Figure 3A:
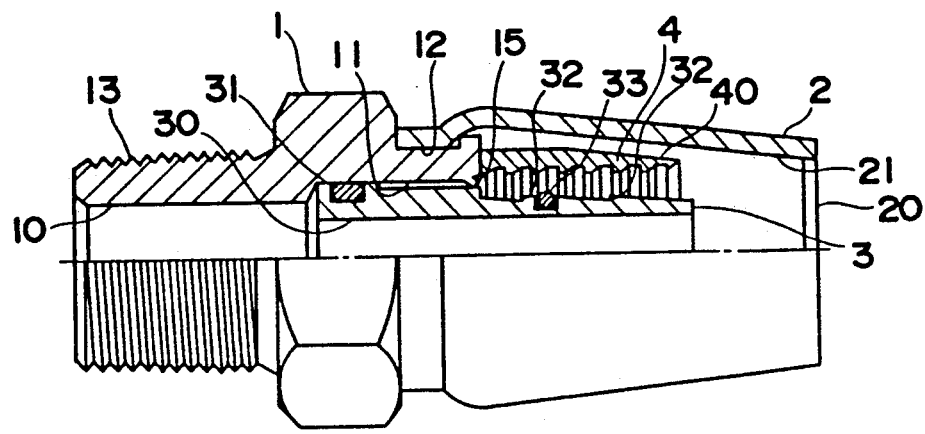
FIGS. 3a and 3b indicate an embodiment of the pipe joint of the present invention.
Figure 3B:
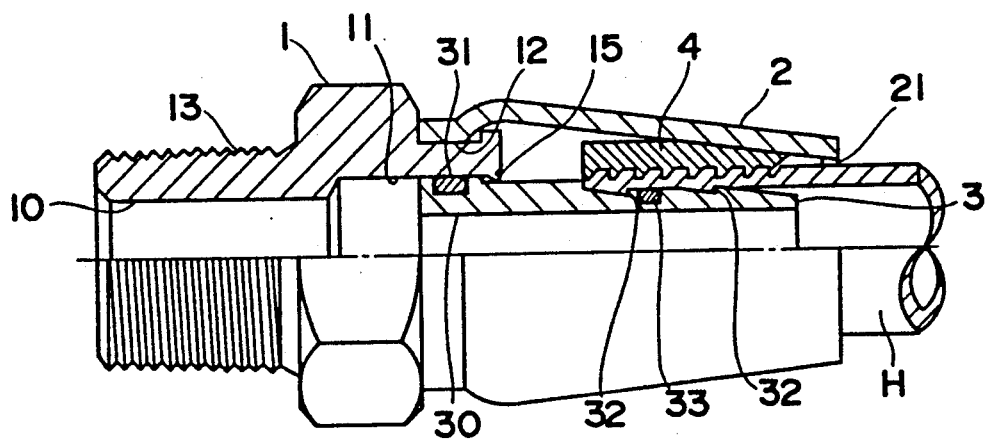

The nipple 1 has a small-diameter hole 10 and a large-diameter hole 11 on its internal circumferential face, and also has a circumferential groove 12 on the external circumferential face. This nipple 1 has an external thread 13 on the external circumferential face on the small-diameter hole 10 side. And at the end of its large-diameter hole 11, as shown in FIG. 3 and 4, is provided an annular projecting part projecting inwardly and toward a pipe inserting port, or an open side in the axial direction of the nipple 1, thereby having a checking part as structure preventing the insert 3 from coming off, which is to be described below.

The socket 2 is fixed to a circumferential groove 12 of the nipple 1 and has a tapered face 21 inclined in such a way that the diameter of its internal circumferential face diminishes toward an opening in axial direction 20. By caulking, the socket 2 is fixed inseparably to the circumferential groove 12 of the nipple 1 as shown in FIGS. 1 and 3.

Figure 4A:
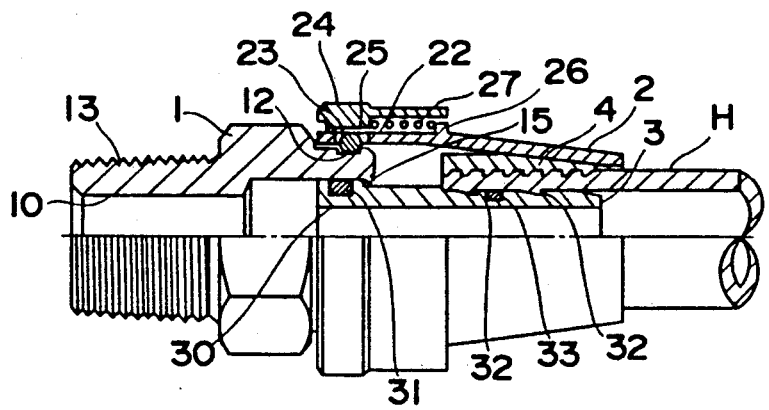
FIGS. 4a, 4b and 4c indicate an embodiment of the pipe joint of the present invention.
Figure 4B:
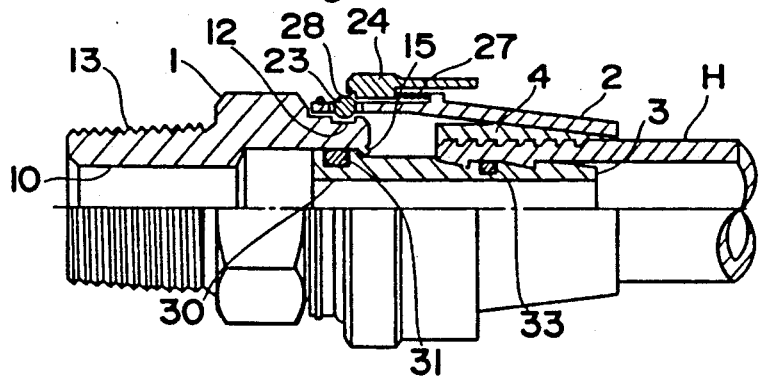
Figure 4C:
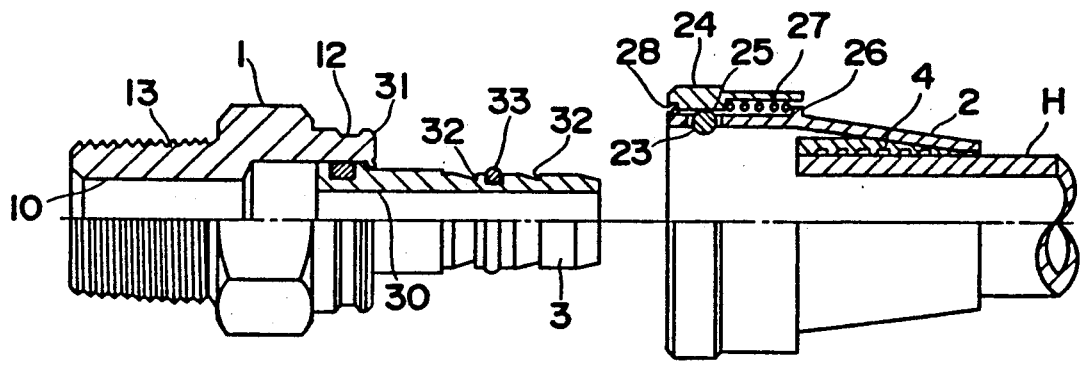

As the embodiment shown in FIG. 4, at the time of connection (see FIG. 4a), a ball 23 of a diameter larger than the thickness of the socket 2 is inserted in a hole 22 formed near the tip of the socket 2 adjacent to the nipple 1 and pressed by an internal convex part of an eternal sleeve 24 to be put in the circumferential groove 12 of the nipple 1 with the external sleeve 24 being pushed out toward the nipple 1 by the elastic force of a spring 27 provided in the space between the internal convex part 25 of the external sleeve 24 fixed to the circumference of the socket 2 and an external convex part 26 of the socket 2; on the other hand, at the time of separation (see FIG. 4b), the ball 23 is pushed out in an internal concave part 28 of the external sleeve 24 so that the ball 23 may surface from the circumferential groove 12 of the nipple 1 with the external sleeve 24 being pulled back toward the socket 2 against the elastic force of the spring 27, whereby the socket 2 is to be attached detachably to the nipple 1. The socket 2 formed with metal pipe material or other pipe material having the equivalent strength may cut down production cost. It is because drawing such pipe material to form the tapered face 21 as shown in the drawing requires no troublesome machining process by lathe or the like which is required in the conventional process to from inclined face 50 on the inner wall of the sleeve.

The insert 3 has a through hole 30 which leads to the small-diameter hole 10 of the nipple 1 and one end of the insert 3 is fitted slidably to the large-diameter hole 11 of the nipple 1, the one end having an O ring as sealing member 31 for sealing the gap between the insert 3 and the wall of the large-diameter hole 11 of the nipple 1. The insert 3 has, on its external circumferential face, an annular rib 32 for preventing a hose H from coming off and the O ring as sealing memebr 31 for sealing the gap between the insert 3 and the hose H.

Figure 2:
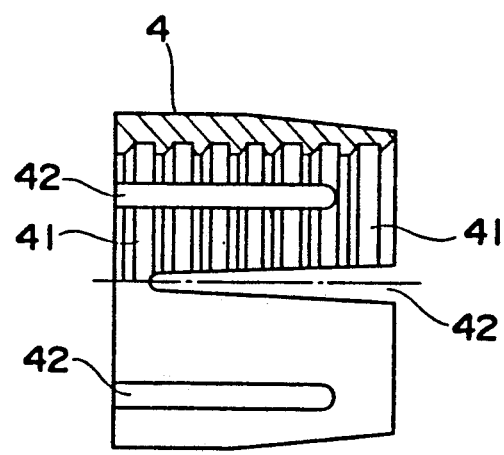
FIG. 2 is a partial longitudinal sectional view of a collet to be used for the pipe joint of the present invention.

The collet 4 has an external circumferential face 40 capable of getting in contact with the tapered face 21 of the socket 2 and is designed to be expandable and contractible in diameter when sliding in the axial direction inside the socket 2. The collet 4 is designed in a way that the inside diameter of this collet 4 is being smaller than the outside diameter of the hose H in a normal state and has an annular groove 41 for preventing the hose H from coming off. In order to allow the collet 4 to be expandable and contractible in the socket 2 while sliding in the axial direction, the collet 4 may have a structure having a plural number of slits in the axial direction as shown in FIG. 2, but is not limited to that structure.

To assembly the pipe joint of the present invetnion with the abovementioned construction, first of all, the insert 3 is to be inserted in the large-diameter hole 11 of the nipple 1 until one end of the insert 3 having the sealing member 31 gets in contact with the opening of the small-diameter hole 10 of the nipple. And then, the collet 4 is to be inserted in around the circumference of the insert 3 until its end gets in contact with the opening of the large-diameter hole 11 of the nipple and the socket 2 is to be fitted to the circumferential groove 12 of the nipple 1.

Figure 1B:
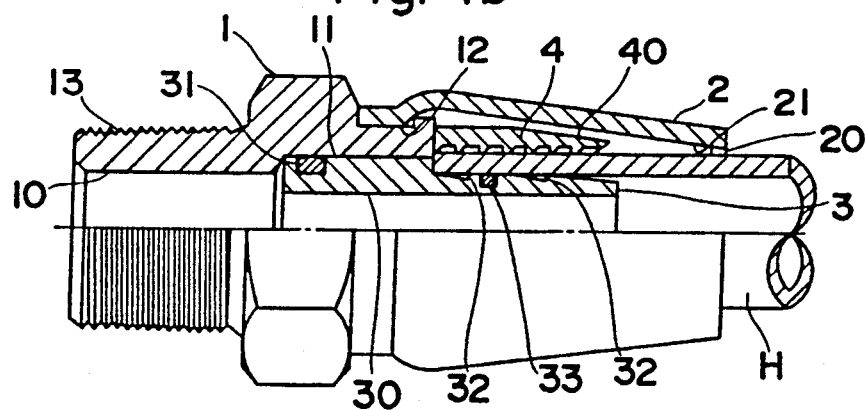
Figure 1C:
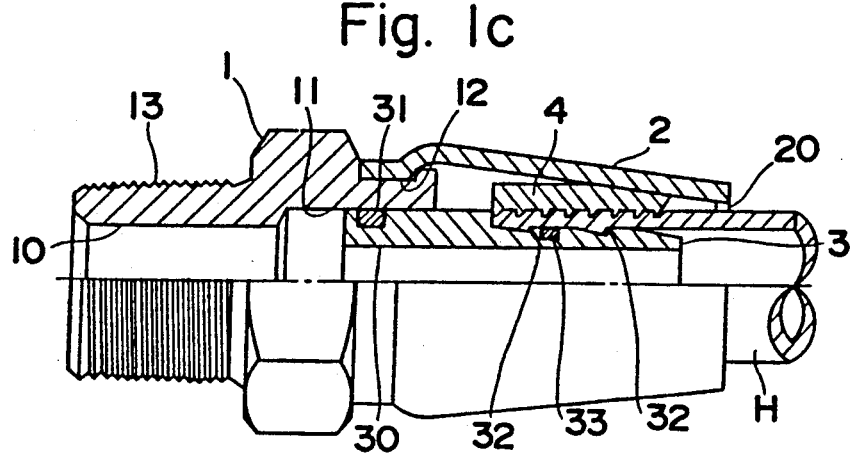

Moreoever, to connect a hose to the pipe joint of the present invention, as shown in FIG. 1b, the hose H is to be inserted between the external circumferential face of the insert 3 and the internal circumferential face of the collet 4 from the opening side 20 of the socket until the end of the hose 4 gets in contact with the opening of the large-diameter hole 11 of the nipple. When an internal pressure is applied to the hose H, as shwon in FIG. 1c, the insert 3 moves toward the opening 20 of the socket 2 with sliding through the large-diameter hole 11 of the nipple. At the same time, as the hose H also moves toward the opening 20 of the socket 2 together with th collet 4, the external circumferential face 40 of the collet 4 gets in contact with the tapered face 21 of the socket, thereby the collet contracting in diameter. And the end part of the hose H is tightened securely between the internal circumferential face of the collet 4 and the external circumferential face of the insert 3.

In the embodiment herein, the body is realized with a nipple 1 but is not limited thereto and may be with something else.

In the above embodiment, the fitting of the socket 2 to the nipple 1 is conducted by caulking but is not limited thereto and may be by some other known art such as screwing.

Furthermore, in the above embodiment, the stepped part of the small-diameter hole 10 and the large-diameter hole 11 is used to prevent the insert 3 from being pushed in excessively, however, it is not limited thereto and may have a small-diameter and a large-diameter hole of a same diameter with providing with a C type ring midway or forming an internal projection, for example.

Namely, it is good enough that, at the place where the insert 3 is restricted not to be pushed in excessively any more, the internal circumference of the insert 3 side of the nipple 1 is reaslized as the large-diameter hole 11 and that at least the point with which the insert 3 is being contacted is realized as the small-diameter hole 10.

Next referring to the drawings, the construction of the pipe joint corresponding to the present inventions is described below.

Figure 5:
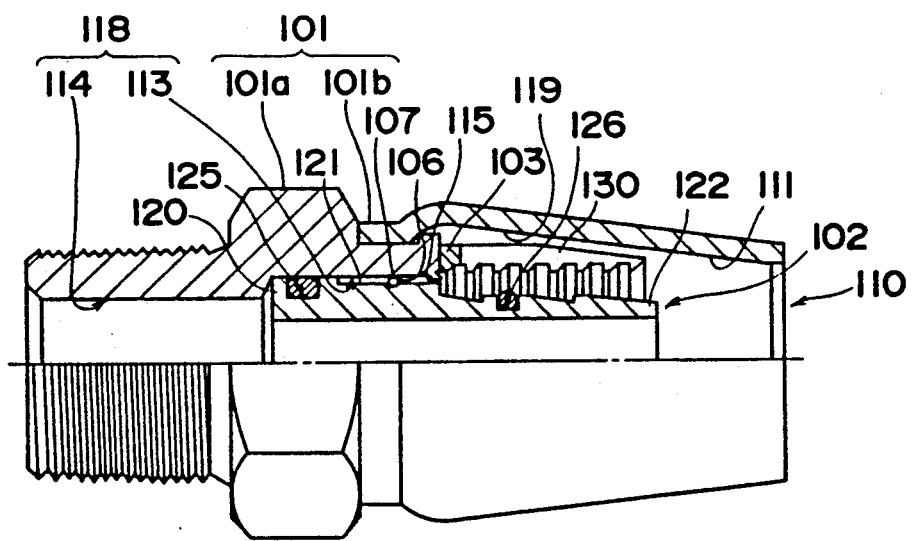
FIG. 5 is a semi cross-sectional view of the pipe joint of the present invetnion.

As indicated in FIG. 5, the pipe joint comprises a cylindrical main body 101 with both ends open, a slender advancing/retreating cylinder 102 fixed to the main body 101 coaxially and slidably within a certain range, and a holding cylinder 103 placed between the main body 101 and the slender advancing/retreating cylinder 103, in a way to freely advance or retreat.

The main body 101 is constructed by caulking a socket 101b on one end of the nipple 101a to constitute the body, as shown in the same drawing, the tip of the said socket 101b being used as a pipe inserting port 110. [In this embodiment, as mentioned above, the main body 101 is divided into a nipple 101a to be the body and a socket 101b, however, it may also be realized as a single unit, instead of two separate pieces.]

As shown in the same drawing, the nipple 101a is constructed to have a large-diameter hole 113 and a small-diameter hole 114 on its internal circumferential face and an internal projection 115 inclining internally toward the pipe inserting port 110 is formed at the connecting end to the socket 101b in the large-diameter hole 113.

The socket 101b is formed in a cylindrical shape with a certain thickness as shown in FIG. 5 and a tapered part 111 is formed on the internal circumference near the pipe inserting port 110, by diminishing the diameter of the socket 101b toward the port.

Namely, in this embodiment, the large-diameter hole 113 and the small-diameter hole 114 formed in the nipple 101a correspond with the small-diameter hole 118 of the main body 101 described above, while the hole of the socket 101b corresponds with the large-diameter hole 119 of the main body described above.

The slender advancing/retreating cylinder 102 has, as shwon in FIG. 5, a structure in which a large-diameter part 120, a medium-diameter part 121 and a small-diameter part 122 are formed in such an order and is fitted to the nipple 101a with the large-diameter part 120 being housed in the large-diameter hole 113.

The large-diameter part 120 is set slightly smaller in diameter than the large diameter hole 113 of the nipple 101a as shown in the same drawing and is provided with a groove 125 on its external circumferential face, the groove 125 being provided with an O ring, thus keeping an airtightness between the large-diameter part 120 of the slender advancing/retreating cylinder 102 and the large-diameter hole of the nipple 101a.

Figure 6A:
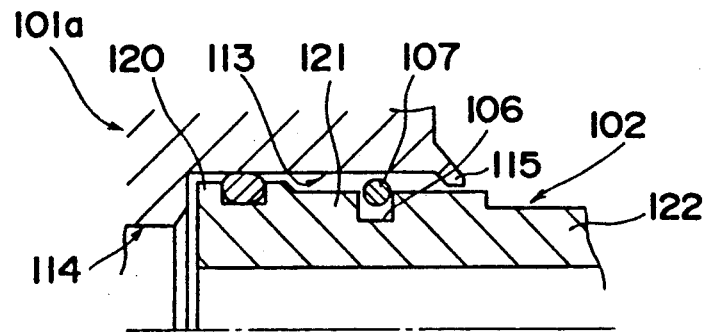
FIGS. 6a, 6b and 6c are drawings showing the relation between the large-diameter hole of the nipple and the C type snap ring.
Figure 6B:
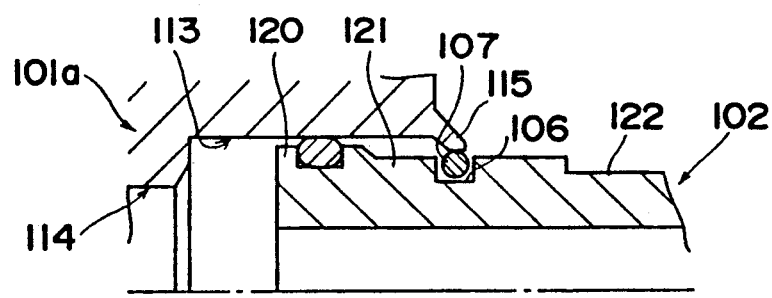
Figure 6C:
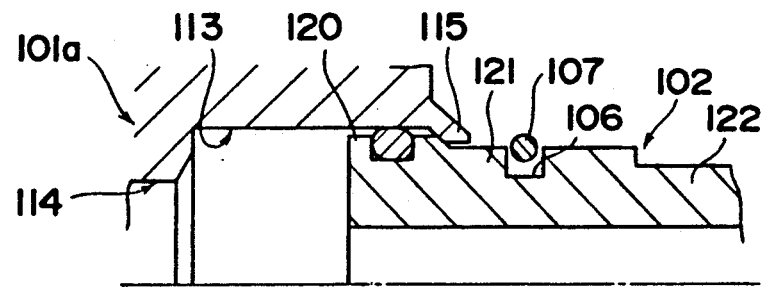
Figure 7:
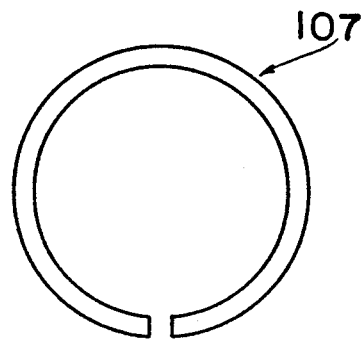
FIG. 7 is an outside diameter drawing of the C type snap ring.

The medium-diameter part 121 is set to have an outside diameter slightly smaller than the inside diameter of the internal projection 115 as shown in FIG. 5 and 6 and is provided with a groove 106 about the middle of the part 121 and in the groove 106 is housed a C type snap ring 107 shaped a shwon in FIG. 7.

The groove 106 is designed to be moved passing the end of the nipple 101a and located closer to the pipe inserting port 110 than the end of the nipple 101a is, when the slender advancing/retreating cylinder 102 moves near the end part of the pipe inserting port 110 side in its sliding range. The outside diameter of the C type snap ring 107, the ring having a circular section, is set slighly smaller than the inside diameter of the large-diameter hole 113 of the nipple 101a and slightly larger than the internal diameter of the internal projection 115 as shwon in FIG. 6a.

The small-diameter part 122 is of about the same diameter as the outside diameter of the pipe to be connected and, as shown in FIG. 5, is provided with a circumferential groove 126 on its external circumferential face. And in the groove 126 is placed an O ring, thereby, in the state where the piping H is held between the slender advancing/retreating cylinder 102 and the holding cylinder 103, securely keeping the airtightness between the internal circumferential face of the pipe H and the external circumferential face of the slender advancing/retreating cylinder 102 as shwon in FIG. 9.

And, the slender advancing/retreating cylinder 102 is designed to slide in the range between the stepped part of the large-diameter hole 113 and the small-diameter hole 114 and the internal projection 115, thereby the cylinder being to advance and retreat.

Figure 8:
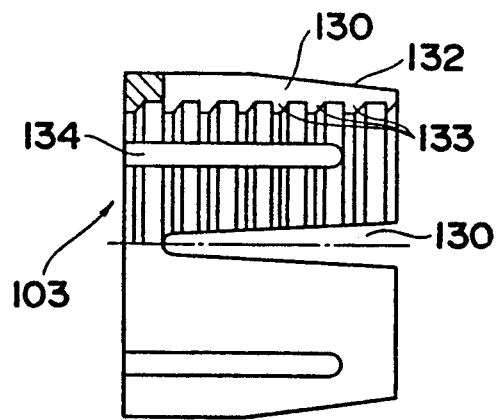
FIG. 8 is a semi cross-sectional view of the holding cylinder.

The holding cylinder 103 is formed with an elastic synthetic resin and, as shwon in FIGS. 5 and 8, its outside diameter is set slightly larger than the diameter of the pipe inserting port 110. And a tapered part 132 corresponding to the tapered part 111 is provided on the external circumference on the side of the pipe inserting port 110 and a plural number of check nails 133 are provided on its internal circumference. On the external circumferential wall of the holding cylinder 103, a slit 130 opening to one end thereof and a slit 134 opening to the other end thereof are provided alternately.

Figure 9:
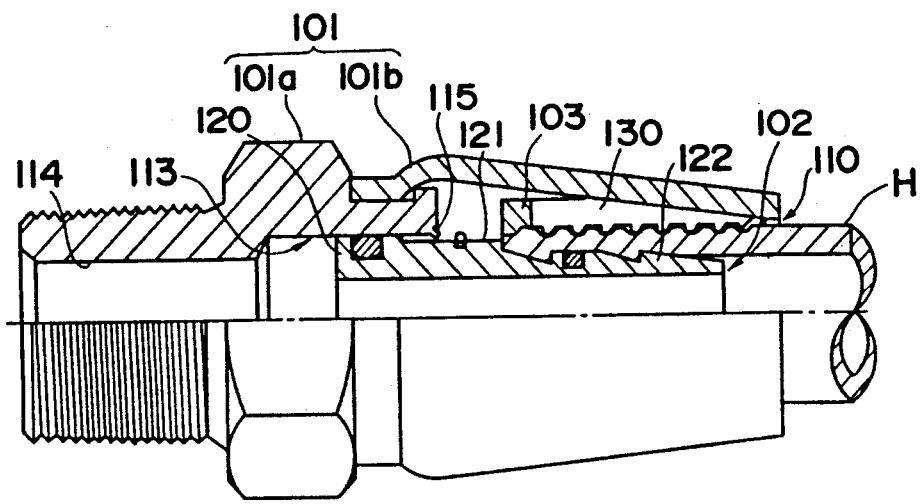
FIG. 9 is a drawing showing the state where a pipe is connected with the pipe joint.
Figure 10:
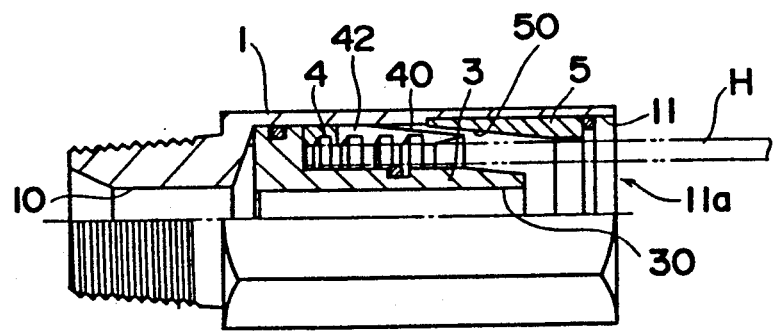
FIG. 10 is a semi cross-sectional view of a conventional pipe joint.

This embodiment, in the state where the said slender advancing/retreating cylinder 102 and holding cylinder 103 are housed in the main body 101 as shwon in FIG. 5, is designed to have the gap between the slender advancing/retreating cylinder 102 and the holding cylinder 103 to be slightly smaller than the thickness of the pipe H to be inserted therein in FIG. 9.

Since the pipe joint is constructed as explanined hereabove, when the pipe H is inserted forcibly between the slender advancing/retreating cylinder 102 and the holding cylinder 103 through the pipe inserting port 110 of the main body 101, a bolding force of the holding cylinder 103 and the slender advancing/retreating cylinder 102 acts on the pipe H because of an elastic restorative force of the holding cylinder 103. In this state, when the pipe H is pulled, by the effect described above, the pipe H is held with a strong force by the check nails 133 of the holding cylinder 103 and the external circumferential wall of the slender advancing/retreating cylinder 102 and, as shown in FIG. 9, the check nails 133 bite in the external circumferencial face of the pipe.

And, in this embodiment, at the connecting operation, or the pulling operation of the pipe H, the C type snap ring 107 placed in the groove 106 of the slender advancing/retreating cylinder 102 is once contracted in diameter through the engagement with the internal projection 115 as shwon in FIGS. 6(a) to (c) and after that returns to the expanded state through the release of the engagement. Since the groove 106 is designed to be moved and located closer to the pipe inserting port 110 than the end part of the nipple 101a is when the slender advancing/retreating cylinder 102 moves near the end part toward the pipe inserting port 110 in its sliding range, in the above pipe-connecting state, the C type snap ring 107 is found in the expanded state at a position closer to the pipe inserting port 110 than the internal projection 115 is, in the said pipe connecting condition.

Consequently, even when a pushing force acts on the connected pipe, the slender advancing/retreating cylinder 102 and the nipple 101a get in the engaged state through the C type snap ring 107, thereby preventing the slender advancing/retreating cylinder 102 from moving. As a result, the connecting condition of the pipe H is stabilized.

In the pipe joint of this embodiment, a pipe connecting section at one end of the nipple, or the opposite side of the pipe inserting port, has connecting structure having threads so that other threaded pipe may be screwed in with covering the structure's outside or with being inserted inside the structure. Also it is not be limited to the structure with threads, however, other connecting structure may also be employed.

In the above embodiment, the small-diameter part 118 is constituted with a large-diamter hole 113 and a small-diameter hole 114, however, this is not limited thereto and may be constituted by setting a same diameter to the small-diameter hole 113 and the large-diameter hole 114 and providing a protrudent member at about the middle of it. In that case, the slender advancing/retreating cylinder 102 is designed to advance and retreat with sliding in a range between the protrudent member and the insternal projection 115.

Moreoever, in the above embodiment, the main body 101 is constructed by caulking a socket 101b on the nipple 101a, but is not limited thereto and may be constructed by some other means of connecting the nipple 101a and the socket 101b, such as screwing.

The invention according to the present application can provide a pipe joint of simple machining and low production cost since it is unnecessary to reduce much of the thickness of the main body and also becuase the socket can be manufactured by drawing of pipe material.

In the invention according to the present application, since the socket 2 fixed to the large-diameter hole 11 side of the nipple 1 is provided with a collet 4 and it is unnecessary to reduce much of the thickness of the large-diameter hole part 11 of the nipple 1, the volume of machining work can be greatly reduced, and also because the tapered face part 21 of the socket 2 on which the collet 4 is to be provided can be formed by drawing of pipe material, simplifying machining work and reducing production cost can be obtained.

The invention also ensure the connection with a safety use since it can prevent the insert 3 from coming off from the nipple 1 at the time of connection.

The invention also enables reuse of the pipe joint as it allows the hose and the pipe joint to be separated.

The inventions have the following further effects:

Even when a pressing force acts on the already connected pipe, the slender advancing/retreating cylinder 102 is engaged with the main body 101 through the C type snap ring 107, thereby movement of the slender advancing/retreating cylinder 102 being prevented and thus the connecting state of the pipe being stabilized.

While there has been described with referring to the drawings what are considered to be preferred embodiments of the invention at present, it will be understood that various modifications on the shape, the size, etc. of different parts may be made therein without deviating from the true spirit and scope of the present invention.

What is claimed is:

1. A pipe joint comprising:
   a cylindrical main body provided with open ends, one of said open ends being a connecting port and the other end being a pipe inserting port engagement means within said cylindrical main body intermediate said connecting port and pipe receiving port defining a sliding range, said cylindrical main body being further provided with a tapered part having an inner circumferential surface which diminishes in diameter towards said pipe inserting port;
   a cylindrical insert which is provided water-stanchly in said cylindrical main body and slideable within said predetermined sliding range, said cylindrical insert being further provided with a radially outwardly directed protruding member;
   a co let provided between said tapered part of said inner circumferential surface of said cylindrical main body and said cylindrical insert, said collet being expandable and contractible when moved in an axial direction of said cylindrical main body, said collet and said cylindrical insert forming an inserting space between said collet and cylindrical insert for receiving and holding an end of a pipe inserted through said pipe inserting port; and
   wherein said engagement means includes
   a projecting part projecting radially inwardly on said cylindrical main body at an end of said sliding range in which said cylindrical insert slides in said cylindrical main body for engagement with said protruding member to prevent said cylindrical insert from coming out of said cylindrical main body.

2. A pipe joint according to claim 1, wherein said cylindrical main body comprises a first section on which the connecting port is provided and a second section in a form of a socket which includes the inner circumferential tapered part and the pipe inserting port, said socket being mounted to one end of the first section which is opposite to the connecting port.

3. A pipe joint according to claim 2, wherein said second section is detachably mounted to said first section.

4. A pipe joint comprising:
   a cylindrical main body having ends with body ends open and said main body having at one end a small diameter part and a large diameter part on its internal surface, the open side of the large diameter part being a pipe inserting port and the small diameter part having engagement means therein defining a predetermined sliding range,
   a slender slidable cylinder having an abutment means thereon and provided with a free end said slender slideable cylinder positioned within said small diameter part and attached to the small diameter part of the main body in a way freely slideable within said certain range, the free end facing toward the pipe inserting port,
   a holding cylinder positioned radially between said large diameter part and said free end in a way to freely advance or retreat between the large-diameter part of the main body and the slender slideable cylinder, and wherein
   the large diameter part is provided with a tapered part which diminishes in diameter toward the pipe inserting port, and said engagement means includes at an end position of said sliding range, a projecting part projecting radially inwardly so as to engage said engagement means on said slideable cylinder to prevent said slideable cylinder from coming out of said small diameter part,
   the outside diameter of the holding cylinder being set slightly larger than the inside diameter of the pipe inserting port and the holding cylinder having a slit opening to the pipe inserting port, the gap between the slender slideable cylinder and the holding cylinder being set slightly smaller than the thickness of a pipe to be inserted therein, the external circumferential surface of the slender slideable cylinder being provided with a groove housing a C-type snap ring of which an uncompressed outside diameter is larger than the diameter of the small-diameter part and said C-type snap ring is in a compressed state when said C-type snap ring is within said sliding range; and when the slender slideable cylinder moves toward the pipe inserting port within the sliding range, said C type snap ring is external of said small diameter part and is uncompressed at a position slightly closer to said pipe inserting port than said projecting part.

5. A pipe joint according to claim 4, wherein the internal projecting part is formed by an internal projection inclining internally toward the pipe inserting port.

6. A pipe joint according to claim 5, where the C type snap ring has a circular section.

7. A pipe joint accoring to claim 5, wherein the uncompressed outside diameter of the C type snap ring is slightly larger than the internal diameter of the internal projection.

8. A pipe joint according to claim 7, where the C type snap ring has a circular section.

9. A pipe joint according to claim 4, where the C type snap ring has a circular section.

* * * * *